(12) United States Patent
Itoh

(10) Patent No.: US 8,564,717 B2
(45) Date of Patent: Oct. 22, 2013

(54) ASSEMBLING METHOD FOR IMAGING APPARATUS AND IMAGING APPARATUS

(75) Inventor: Kaoru Itoh, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 318 days.

(21) Appl. No.: 13/048,119

(22) Filed: Mar. 15, 2011

(65) Prior Publication Data
US 2011/0228133 A1   Sep. 22, 2011

(30) Foreign Application Priority Data

Mar. 16, 2010   (JP) .................................. 2010-059186

(51) Int. Cl.
*H04N 5/225*   (2006.01)

(52) U.S. Cl.
USPC .......................................................... 348/374

(58) Field of Classification Search
USPC .......................................................... 348/374
See application file for complete search history.

(56) References Cited

U.S. PATENT DOCUMENTS

| 7,259,923 | B2 | 8/2007 | Nuno et al. | |
|---|---|---|---|---|
| 7,505,216 | B2 | 3/2009 | Nuno | |
| 7,746,584 | B2 | 6/2010 | Honsho et al. | |
| 2005/0275725 | A1* | 12/2005 | Olsson et al. | 348/207.99 |
| 2006/0290801 | A1 | 12/2006 | Jao | |
| 2009/0051797 | A1* | 2/2009 | Yao | 348/308 |
| 2009/0141135 | A1 | 6/2009 | Suzuki et al. | |

FOREIGN PATENT DOCUMENTS

| CN | 1637456 A | 7/2005 |
|---|---|---|
| CN | 101292517 A | 10/2008 |
| CN | 101387813 A | 3/2009 |
| CN | 101766021 A | 6/2010 |
| JP | 2005-43597 | 2/2005 |
| JP | 2006-129391 A | 5/2006 |
| JP | 2006-149461 | 6/2006 |
| JP | 2007-6502 | 1/2007 |
| JP | 2008-185786 | 8/2008 |
| JP | 2009-65248 | 3/2009 |
| JP | 2009-122628 | 6/2009 |

OTHER PUBLICATIONS

Combined Office Action and Search Report issued Apr. 11, 2013 in Chinese Patent Application No. 201110141777.6 with English language translation.

* cited by examiner

*Primary Examiner* — Anthony J Daniels
(74) *Attorney, Agent, or Firm* — Oblon, Spivak, McClelland, Maier & Neustadt, L.L.P.

(57) ABSTRACT

A method for assembling an imaging apparatus includes steps of: preparing an external cover, an image pickup device, and a tilt detection unit configured to output a tilt signal of the imaging apparatus, setting an orientation of the external cover to be a predetermined orientation, matching an orientation of the image pickup device with the orientation of the external cover in the state where the orientation of the external cover is the predetermined orientation, fixing the image pickup device in the imaging apparatus in a state where the orientation of the image pickup device is matched with the orientation of the external cover, storing a tilt signal output by the tilt detection unit in a state where the orientation of the external cover is set to be the predetermined orientation.

16 Claims, 7 Drawing Sheets

CHART FOR HORIZONTAL CHECK

ASSEMBLING METHOD FOR IMAGING APPARATUS AND IMAGING APPARATUS

CROSS REFERENCE TO RELATED APPLICATIONS

The present application is based on and claims priority from Japanese Application Number 2010-059186, filed on Mar. 16, 2010, the disclosure of which is hereby incorporated by reference herein in its entirety.

BACKGROUND OF THE INVENTION

1. Field of the Invention

The present invention relates to an assembling method for an imaging apparatus and the imaging apparatus, which is provided with a function of converting an optical image to an electric signal by a photoelectric conversion image pickup device, and particularly to an adjustment of a display device which electrically detects a tilt of the imaging apparatus, and performs tilt display corresponding to the tilt information.

2. Description of the Related Art

Some imaging apparatus, such as a digital camera provided with the function to convert an optical image into electric information with a photoelectric conversion image pickup device, are provided with the tilt indicator. Some imaging apparatus such as a digital camera having a function of converting an optical image to an electric signal by a photoelectric conversion image pickup device is provided with a tilt indicator. This tilt indicator detects a tilt by the tilt detection unit such as an acceleration sensor or a gyro sensor, then processes the detected signal to calculate the tilt angle, so that the tilt indicator provides a display corresponding to the tilt angle on its monitor screen. Thus, the tilt indicator can be called a type of electronic level. With an imaging apparatus such as a camera provided with the tilt indicator, a user can determine the horizontal and vertical directions of the imaging apparatus while looking at the display of the tilt indicator. Thus, such an imaging apparatus is effective, for example, when a user wants to shoot the horizontal line on the screen horizontally with a high accuracy, or wants to shoot a vertical surface of a building on the screen vertically with a high accuracy.

The manufacturing process of such an imaging apparatus includes calibration of a tilt of an image pickup device (for example, a solid state image pickup device such as CCD) to be incorporated into the imaging apparatus, and an output of the tilt detection unit such as an acceleration sensor, or a gyro sensor. The tilt angle with respect to the horizontal direction of the main body of an imaging apparatus is called a roll angle, which appears as a tilt with respect to the horizontal direction on an image pickup screen.

DESCRIPTION OF THE RELATED ART

Japanese Patent Application Publication No. 2009-65248 discloses a technology which enables an imaging apparatus having a tilt indicator to obtain tilt information for adjusting an image horizontally or vertically with a high accuracy. This technology includes a level module which has means to calculate a tilt from the output of an acceleration sensor, and means to display the tilt on the monitor by using a frame and an indicator based on the calculated tilt. At the start of the operation of a mechanical drive unit of a digital camera as an imaging apparatus, control of the level module is changed, and at the end of the operation of the mechanical drive unit, control of the level module is changed again. The control processing of the level module includes: erasing the means (the frame and the indicator) to display the tilt displayed on the monitor; shifting the mode of the acceleration sensor to power saving mode; and stopping the processing of the means to calculate a tilt from the acceleration sensor output. The control processing of the level module also includes: resuming the mode of the acceleration sensor from the power saving mode; calculating tilt from the acceleration sensor output, then re-display the frame and the indicator on the monitor. By performing such control processing, the influence of the noise component due to the operation of the mechanical drive unit is reduced, thus accurate tilt can be obtained. The most of the above control processing is achieved by software.

In the manufacturing process of the imaging apparatus described in Japanese Unexamined Patent Application Publication No. 2009-65248, the tilt of the image pickup device and the output of the acceleration sensor are calibrated.

However, in Japanese Unexamined Patent Application Publication No. 2009-65248, calibration of a relative tilt between the exterior case and the image pickup device in a state where the external cover, the image pickup device, and the acceleration sensor are all integrated is not disclosed.

In the manufacturing process of the imaging apparatus provided with the conventional tilt indicator, for the following relative positional relationship, respective tolerances are permitted: relative positional relationship between the exterior case and the barrel unit; relative positional relationship between the barrel unit and the image pickup device; and relative positional relationship between the acceleration sensor and the circuit board. Due to accumulated tolerances, the image pickup device and the acceleration sensor may be attached to the exterior case with a tilt.

In such a case, the tilt of the image pickup device with respect to the exterior case is not calibrated. Accordingly, even though a user places the imaging apparatus on a horizontal desk, the tilt indicator of the imaging apparatus may not indicate the tile as zero. The higher the display accuracy of the degree of tilt of the tilt indicator of the imaging apparatus, the greater the deviation of the roll angle of the image pickup device with respect to the external cover. Hence, the deviation is more clearly recognized by the user. That is to say, even in the case where the imaging apparatus is placed on a surface plate installed horizontally, there is a problem in that the tilt indicator does not indicate the tilt as zero.

SUMMARY OF THE INVENTION

An object of the present invention is to provide an assembling method for an imaging apparatus and the imaging apparatus which is capable of indicating a tilt as zero in the case where the imaging apparatus is placed on a horizontal desk or the like.

A method for assembling an imaging apparatus according to an embodiment of the present invention, includes the steps or preparing an external cover, an image pickup device, and a tilt detection unit configured to output a tilt signal of the imaging apparatus, setting an orientation of the external cover to be a predetermined orientation, matching an orientation of the image pickup device with the orientation of the external cover in the state where the orientation of the external cover is the predetermined orientation, fixing the image pickup device in the imaging apparatus in a state where the orientation of the image pickup device is matched with the orientation of the external cover, storing a tilt signal with respect to the image pickup device, which is output by the tilt detection unit in a state where the orientation of the external cover is set to be the predetermined orientation.

DETAILED DESCRIPTION OF THE PREFERRED EMBODIMENTS

Hereinafter, an assembling method for an imaging apparatus according to the present invention, and an embodiment of an imaging apparatus are described with reference to the drawings. The embodiment is an example of application of the imaging apparatus according to the present invention to a digital camera.

Figure 6:
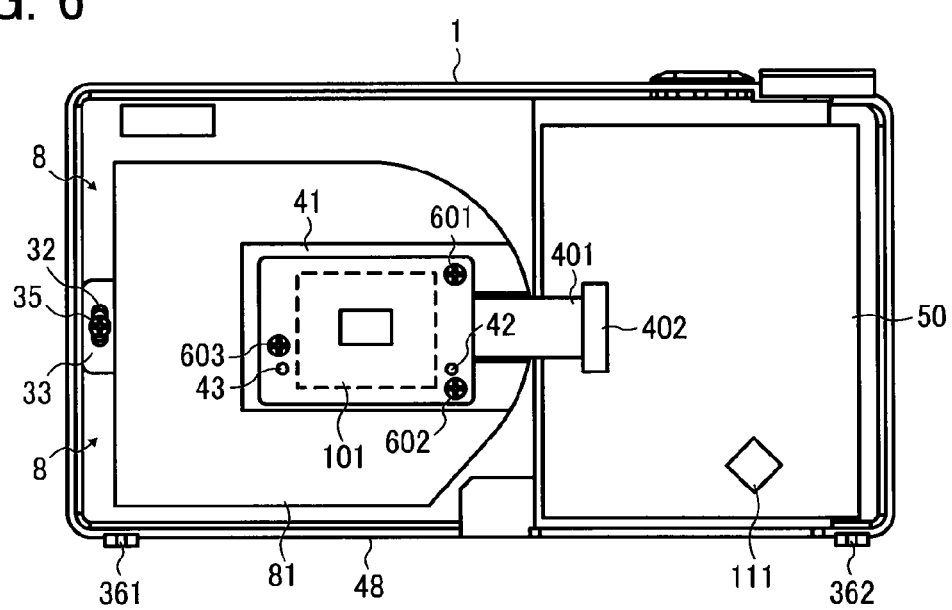
FIG. 6 is a rear view showing an exemplary adjusting device of the tilt indicator in the imaging apparatus according to the present invention.

An imaging apparatus according to an embodiment of the present invention includes, as shown in, for example, FIG. 6, an external cover 1, an image pickup device 101, a tilt detection unit 111 configured to output a tilt signal of the imaging apparatus, an image pickup device fixation unit configured to adjust an orientation of the image pickup device 101 to be matched with an orientation of the external cover 1 and fix the image pickup device 101 in the imaging apparatus, and a storage unit configured to store the tilt signal output by the tilt detection unit 111. The storage unit stores a tilt signal with respect to the image pickup device, which is output by the tilt detection unit in a state where the image pickup device 101 is fixed by the image pickup device fixation unit such that the orientation of the image pickup device 101 is matched with the orientation of the external cover 1 and where the orientation of the external cover 1 is set to be a predetermined orientation, more particularly, for example, horizontally and vertically aligned. The imaging apparatus further includes a display unit 11 configured to display an image captured by the image pickup device 101, a calculation unit 104 configured to calculate a tilt of the imaging apparatus based on the tilt signal output by the tilt detection unit 111, and a display control unit configured to allow the display unit 11 to display the tilt of the imaging apparatus calculated by the calculation unit.

Figure 1:
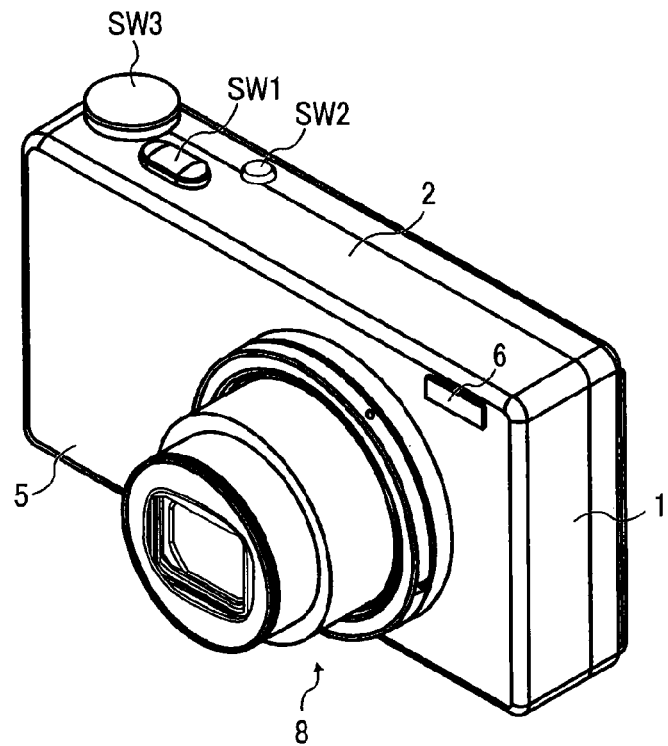
FIG. 1 is an external perspective front view showing an embodiment of a digital camera according to the present invention.
Figure 2:
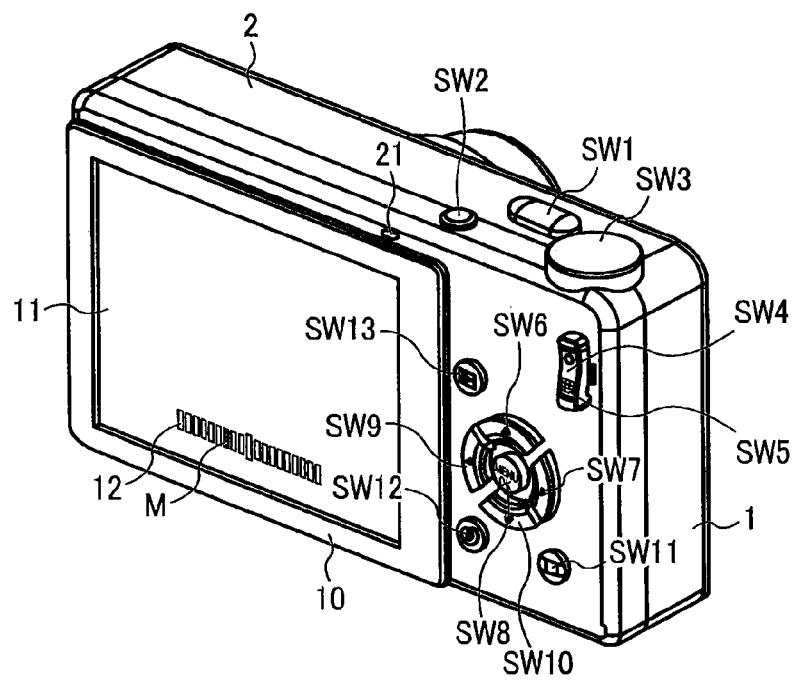
FIG. 2 is an external perspective rear view showing the embodiment.

On an upper surface 2 of an external cover 1 of the digital camera as the imaging apparatus in FIGS. 1 and 2, a shutter switch (release switch) SW1 is to be depressed at the time of shooting an image, a power switch SW2, and a mode dial switch SW3 for switching between various modes are disposed. Also, on a front surface 5 of the imaging apparatus, a strobe light unit 6, and a barrel unit 8 containing a photographing optical system which will be described later are disposed.

On a rear surface 10 of the imaging apparatus, the image of a subject and mode information are displayed, for example, the display unit (hereinafter referred to as "LCD monitor") 11 including an electronic view panel such as a liquid crystal display device (LCD), for example, for displaying the image of a subject and also displaying mode information, a zoom [tele] switch SW4, a zoom [wide] switch SW5, an upper switch SW6, a right switch SW7, a menu/OK switch SW8, a left switch SW9, a lower switch SW10, a display switch SW11, a self/delete switch SW12, a replay switch SW13 are provided. An LED display unit 21 for focus check and strobe charging check is provide, which serves as a confirm lamp indicating completion of focus control to a shooting subject and correct the focus, and displays by light that a main capacitor of a strobe light emitter is being charged. The switches SW1 to SW13 are switches operated by a user, and constitute an operation key unit.

The appearance of the digital camera as an embodiment of the imaging apparatus according to an embodiment of the present invention is not limited to, and may be different from, the appearance shown in FIG. 1 or 2. Because the function and the operation of each part of the digital camera as an imaging apparatus are publicly known, thus detailed description thereof is omitted. Next, description will be provided for the system configuration inside the imaging apparatus based on FIG. 3 with reference to FIGS. 1 and 2.

Figure 3:
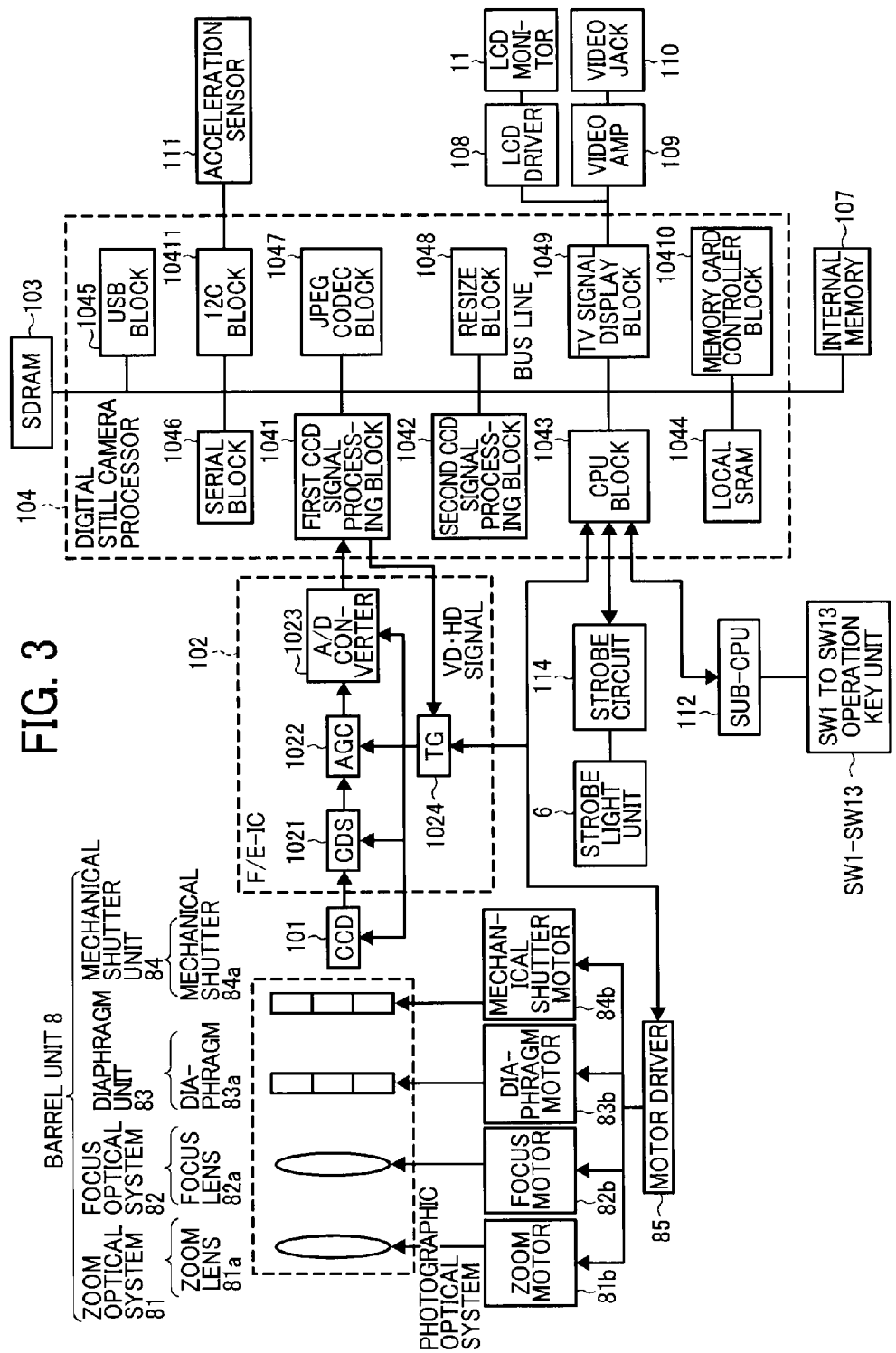
FIG. 3 is a block diagram showing an exemplary system configuration inside an imaging apparatus according to the embodiment.

In FIG. 3, the image pickup device 101 is a solid-state image pickup device configured of, for example, a CCD (Charge Coupled Device) for photo-electrically converting an optical image. An image pickup device using a CMOS (Complementary Metal-Oxide-Semiconductor) or the like in place of the CCD may be used instead. The imaging apparatus includes a front end IC (hereinafter, referred to as "F/E-IC") 102 as means for processing an image signal captured by the image pickup device 101. The F/E-IC 102 is configured as an IC (Integrated Circuit) including a correlated double sampling unit (CDS) 1021 configured to perform correlated double sampling for image noise rejection, a gain control unit (AGC) 1022 configured to perform gain adjustment, an A/D (Analog-Digital) converter 1023 configured to perform analog-digital conversion, and a timing signal generating unit (TG) 1024 configured to generate a driving timing signal.

A vertical synchronizing signal VD and a horizontal synchronizing signal HD are supplied to the timing signal generating unit 1024 from a first CCD signal processing block 1041, and the timing signal generating unit 1024 is configured to output a driving timing signal to the image pickup device 101 and the F/E-IC 102 in response to a signal outputted from a CPU block 1043.

The imaging apparatus includes a digital still camera processor (hereinafter referred to as a "processor") 104 that constitutes an important part of the system configuration inside. The processor 104 includes a first CCD signal processing block 1041, a second CCD signal processing block 1042, a central processing unit (CPU) block 1043, a local SRAM (Static Random Access Memory) 1044, a USB block 1045, a serial block 1046, a resize (RESIZE) block 1048, a TV signal display block 1049, and a memory card controller block 10410. The first CCD signal processing block 1041 performs white balance setting and gamma setting on outputted mage data inputted from the image pickup device 101 via the F/E-IC 102, and also supplies a vertical synchronizing signal VD and a horizontal synchronizing signal HD to the timing signal generating unit (TG) 1024 of the F/E-IC 102. The second CCD signal processing block 1042 performs conversion of image data to luminance data and color difference data by filtering processing. The central processing unit (CPU) block 1043 controls the operation of each part of the apparatus. The local SRAM (Static Random Access Memory) 1044 temporarily stores data and the like required for control. The USB block 1045 performs USB communications with external equipment such as a PC (Personal Computer). The serial block 1046 performs serial communications with external equipment such as a PC. The JPEG codec (JPEG-CODEC) BLOCK 1047 performs JPEG compression/expansion. The resize (RESIZE) block 1048 increases and reduces the size of image data by interpolation processing. The TV signal display block 1049 converts image data to a video signal for displaying image on external display equipment, such as the LCD monitor 11 or a TV (Television) receiver. The memory card controller block 10410 performs control on a memory card for recording data of captured image. These blocks are connected to one another via a bus line.

Outside the processor 104, a SDRAM (Synchronous Dynamic Random Access Memory) 103 is disposed which stores RAW-RGB image data (RGB image data subjected to only white balance adjustment and γ adjustment), YUV image data (image data subjected to the conversion to luminance data and color difference data), and JPEG image data (image data subjected to JPEG compression). The SDRAM 103 is connected to the processor 104 via a memory controller (not shown) and the bus line.

The SDRAM 103 is a memory which temporarily stores image data when various types of processing are performed on the image data by the processor 104. The image data to be stored is, for example, RAW-RGB image data taken in from the image pickup device 101 via the F/E-IC 102, and having been subjected to white balance adjustment and gamma adjustment in the first CCD signal processing block 1041, YUV image data having been subjected to the conversion to luminance data and color difference data in the second CCD signal processing block 1042, or JPEG image data having been subjected to JPEG compression in the JPEG-CODEC block 1047.

Outside the processor 104, an internal memory 107 such as RAM, and a ROM (not shown) in which a control program, parameters and the like are stored are provided, which are also connected to the processor 104 via the bus line. The internal memory 107 is a memory which enables to store data of captured image. The control program stored in the ROM is loaded to a main memory (not shown) of the processor 104 once the power supply switch SW2 of the imaging apparatus, and then, the processor 104 controls the operation of each part in accordance with the control program, and causes the internal memory 107 to temporarily store control data, parameters, and the like.

The barrel unit 8 includes a lens barrel constituted of a zoom optical system 81 having a zoom lens 81a for taking an optical image of a subject, a focus optical system 82 having a focus lens 82a, a diaphragm unit 83 having a diaphragm 83a, and a mechanical shutter unit 84 having a mechanical shutter 84a. Note that, the zoom lens 81a, the focus lens 82a, and the diaphragm 83a constitute a photographing optical system.

The optical axis of the photographing optical system is referred to as a Z axis and a plane orthogonal to the Z axis is referred to as an X-Y plane.

The zoom optical system 81, the focus optical system 82, the diaphragm unit 83, and the mechanical shutter unit 84 are driven respectively by the zoom motor 81b, the focus motor 82b, the diaphragm motor 83b, and the mechanical-shutter motor 84b. The motors 81b to 84b of the barrel unit 8 are driven by a motor driver 85. The motor driver 85 is controlled by the CPU block 1043 of the processor 104.

The imaging apparatus includes the image pickup device 101 configured to photo-electrically convert an optical image obtained by each of the lens system of the barrel unit 8. A subject optical image is formed on a light receiving surface of the image pickup device 101, and the image pickup device 101 converts the subject optical image to electrical image signals, that is, captures an image of the subject, and outputs the image signals to the F/E-IC 102. The signal control processing is performed through the TG 1024 with a VD (vertical synchronization)-HD (horizontal synchronization) signal outputted from the first CCD signal processing block 1041 of the processor 104. The TG 1024 generates a driving timing signal on the basis of the VD-HD signal.

The processor 104 performs white balance adjustment and gamma adjustment on output data obtained from the image pickup device 101 via the F/E-IC 102. Thus, a vertical synchronizing signal VD and a horizontal synchronizing signal HD are supplied by the first CCD signal processing block 1041, and the conversion to luminance data and color difference data using filtering processing is performed by the second CCD signal processing block 1042. The CPU block 1043 controls the operation of each part of the apparatus and temporarily stores data and the like required for the control in the local SRAM 1044.

In addition, the processor 104 calculates the tilt of the imaging apparatus on the basis of tilt angle data sent from the acceleration sensor 111, and displays the degree of tile on the LCD monitor 11 via an LCD driver 108 by using the tilt information (the detail of the processing will be described later). The CPU block 1043 further controls a strobe circuit 114 to cause the strobe light unit 6 to emit illumination light.

The CPU block 1043 is connected to a sub CPU 112, and the sub CPU 112 is connected to an operation key unit constituted of operation switches SW1 to SW13. The operation key unit is an operation unit constituted of a group of key switches operated by a user. In addition, the sub CPU 112 is a CPU including a ROM and a RAM in one chip, and outputs output signals from the operation key unit and the like to the CPU block 1043 as user operation information.

The USB block 1045 performs USB communications with external equipment such as a personal computer via a USB connector (not shown). The serial block 1046 is connected from a serial driver circuit (not shown) to external equipment via a serial communication connector such as an RS-232C connector, and performs serial communications.

The TV signal display block 1049 is connected to the LCD monitor 11 via the LCD driver 108, and is connected to a video jack (a jack for connecting the camera to an external display device such as TV) 110 via a video amplifier (video AMP), that is, an amplifier 109 for converting a video signal outputted from the TV signal display block 1049 to that of a 75Ω impedance.

The memory card controller block 10410 is connected to a card contact point built in a memory card slot (not shown). An I2C (inter integrated circuit) block 10411 is connected to the acceleration sensor 111 as tilt detection unit.

The LCD driver 108 drives the LCD monitor 11, and converts a video signal outputted from the TV signal display block 1049 to a signal for displaying an image on the LCD monitor 11. The LCD monitor 11 is a display for monitor, and is provided with a view to monitor the state of a subject before shooting, to confirm a captured image, and to display the tilt of the imaging apparatus, described later. The LCD monitor 11 is capable of displaying image data stored in a memory card or the internal memory 107, information on the tilt of the imaging apparatus, and the like.

The video AMP 109 is an amplifier for converting a video signal outputted from the TV signal display block 1049 to that of a 75Ω impedance. The video jack 110 is a connection jack to be connected to an external display device such as a TV receiver for displaying an image on the external display device by inputting a video signal to the external display device.

Figure 4:
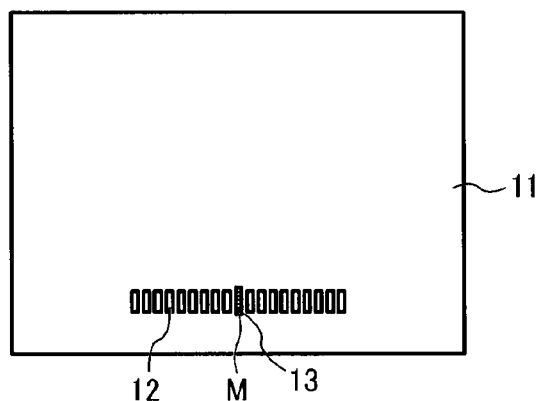
FIG. 4 is a front view showing an exemplary tilt display image according to the present invention.
Figure 5:
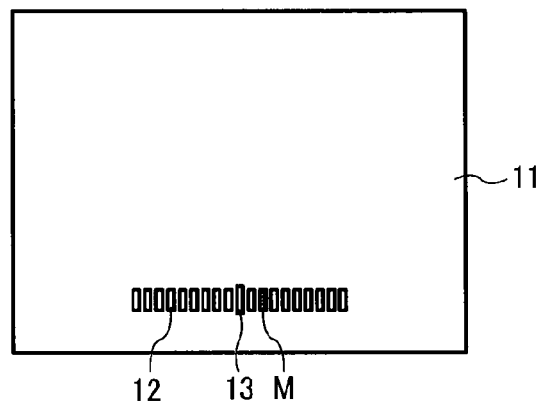
FIG. 5 is a front view showing a different display aspect according to the tilt display image.

The acceleration sensor 111 as the tilt detection unit is mounted on a printed circuit board (PCB) on which each aforementioned circuit portion is configured. The acceleration sensor 111 detects data (X, Y) on the two axes X and Y and data on the temperature T, and sends the data to the I2C block 10411 of the processor 104. The processor 104 calculates, by using for example the CPU block 1043 in the processor 104, tilt information including a roll angle to be displayed on the basis of the data given from the acceleration sensor 111 via the I2C block 10411. Accordingly, the processor 104 acts also as the tilt calculation unit. On the LCD monitor 11, a tilt indication image 12 is displayed in the form of marks of a scale at constant intervals as shown in FIGS. 2, 4, and 5. The calculated tilt information is displayed by synthesizing an image of a marker M as a mark at a position indicating the roll angle on the indication image 12. The position of the marker M displayed on the indication image 12 shows the tilt of the acceleration sensor 111, that is, the tilt of the imaging apparatus. The indication image 12, the CPU block 1043 for displaying tilt information including a roll angle on the indication image 12, and also the processor 104 including the CPU block 1043 constitute a tilt indicator.

When pieces of output data (X, Y) of the two axes X and Y orthogonal to each other under zero gravity are represented by X0 and Y0, respectively, the roll angle θ of the acceleration sensor 111 with respect to the horizontal direction is expressed by the following formula (1).

$$\theta[deg]=180/\pi*\arctan\{(Y-Y0)/(X-X0)\} \quad (1)$$

To the indication image 12, the display of the marker M is added, which is a quasi-bubble image appeared to be a bubble in a bubble level using liquid. The tilt angle is found by checking the position of the marker M in the indication image 12.

For this reason, the processor 104 displays while synthesizing the image of the marker M indicating the angle on the indication image 12 as shown in FIGS. 4 and 5. When the imaging apparatus is set correctly in the horizontal direction, the marker M is at a center position 13 on the indication image 12 as shown in FIG. 4. When the imaging apparatus is diagonally right up, the marker M is on the left-hand side on the indication image 12 in accordance with the angle. When the imaging apparatus is diagonally left up, the marker M is on the right-hand side on the indication image 12 in accordance with the angle.

The imaging apparatus may further include an image pickup device attachment plate. The image pickup device is attached to the barrel unit with the image pickup device attachment plate interposed therebetween. It is possible for the acceleration sensor 111 to be attached to the barrel unit 8 or to an image pickup device attachment plate 40. The acceleration sensor 111 is, however, easily influenced by heat and vibrations, and accordingly, is desirably disposed at a position away from a heat generating source and away from a mechanical vibration source. In this respect, in the illustrated embodiment, the acceleration sensor 111 is attached to a main circuit board 50 which is separated from the barrel unit 8, and having no heat generation and vibrations due to mechanical driving. The attachment of the acceleration sensor 111 as to be separated from the image pickup device 101 is also one reason for requirement of the configuration of positional relationship between the image pickup device 101 and the acceleration sensor 111.

Moreover, in the illustrated embodiment, the acceleration sensor 111 is disposed near the edge portion of the main circuit board 50. Since the main circuit board 50 is fixed to the external cover 1 at the edge portion by means of screws or the like, the acceleration sensor 111 is disposed near the fixation portion to be unlikely to be influenced by vibrations or the like and is disposed away from circuit elements including IC mounted on the main circuit board 50 to be unlikely to be influenced by heat emitted from the circuit elements.

In assembling processes of the imaging apparatus, the image pickup device 101 is set with no tilt, and the calibration is perform for the image pickup device in this state by using the output of the acceleration sensor 111. In this way, when the roll angle of the imaging apparatus is zero, the tilt of the image pickup device 101 is also zero, so that there is no tilt in an image captured by the image pickup device 101. Suppose, however, the case where the image pickup device 101 is tilted with respect to the external cover 1 of the imaging apparatus with no adjustment of the tilt of the image pickup device 101 with respect to the external cover 1. In this case, even when the imaging apparatus is placed on a surface plate set correctly in the horizontal direction, the marker M is located at a position displaced by 1, 2, or 3 marks from the center position 13 on the indication image 12 as shown in FIG. 5, so that the tilt is not indicated as zero.

In this respect, the present invention provides a method and a structure of adjusting an indicator which enable the tilt indicator to exactly indicate the tilt as zero when the external cover of the imaging apparatus is correctly horizontal in the horizontal direction. Hereinafter, embodiments of the adjusting method and adjusting structure are described. The method for assembling an imaging apparatus, includes the steps of preparing an external cover, an image pickup device, and a tilt detection unit configured to output a tilt signal of the imaging apparatus, setting an orientation of the external cover to be a predetermined orientation, more particularly, for example, horizontally and vertically aligned, matching an orientation of the image pickup device with the orientation of the external cover in the state where the orientation of the external cover is horizontally and vertically aligned, fixing the image pickup device in the imaging apparatus in a state where the orientation of the image pickup device is matched with the orientation of the external cover, storing a tilt signal output by the tilt detection unit in a state where the orientation of the external cover is set to be horizontally and vertically aligned.

The drawings disclose an embodiment in which orientations of the external cover and the image pickup device are matched with each other in the horizontal and vertical directions by attachment with the angle of the barrel unit being adjusted with respect to the external cover and an embodiment in which orientations of the external cover and the image pickup device are matched with each other in the horizontal and vertical directions by attachment with the angle of the image pickup device being adjusted with respect to the barrel unit. That is, In an embodiment, the method for assembling the imaging apparatus may further include the steps of fixing the image pickup device to a barrel unit, matching the orientation of the image pickup device fixed to the barrel unit with the orientation of the external cover in a state where the orientation of the external cover is set to be horizontally and vertically aligned, and attaching the barrel unit to the external cover in a state where the orientation of the image pickup device is matched with the orientation of the external cover.

Figure 7:
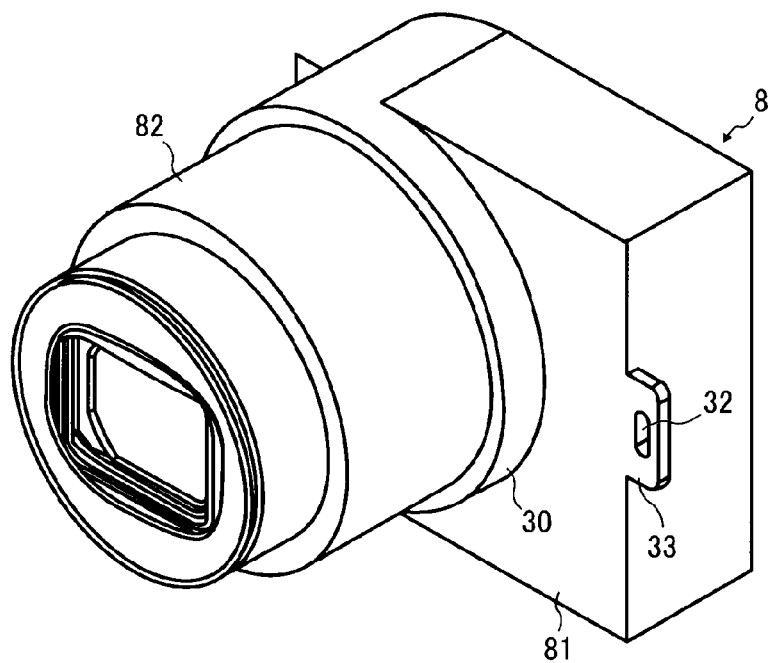
FIG. 7 is a perspective view showing a barrel unit in the embodiment.
Figure 8:
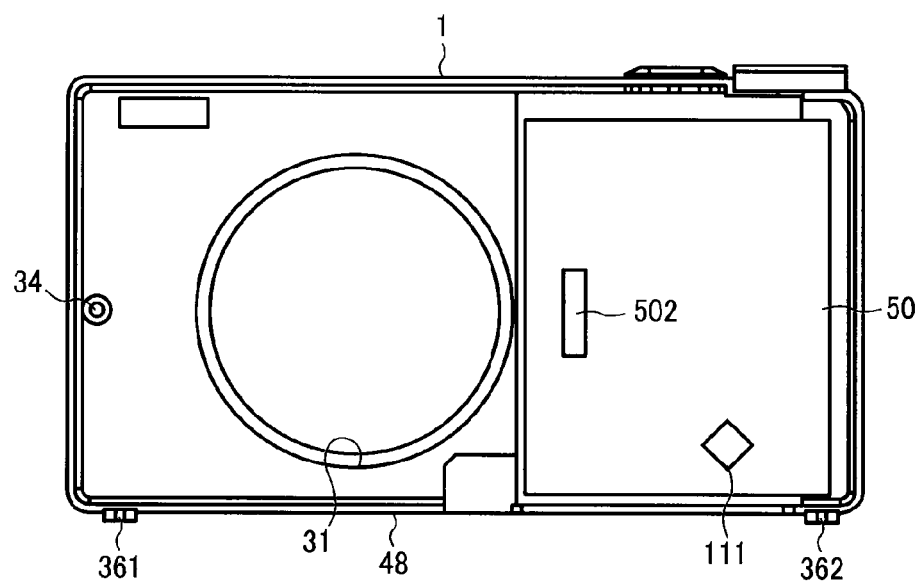
FIG. 8 is a rear view showing an external cover in the embodiment.

First, the embodiment shown in FIGS. 6 to 8 will be described. In FIGS. 6 to 8, the barrel unit 8 includes, as has already been described using FIG. 3, a lens barrel 82 constituted of the zoom optical system 81 having the zoom lens 81a, the focus optical system 82 having the focus lens 82a, the diaphragm unit 83 having the diaphragm 83a, and the mechanical shutter unit 84 having the mechanical shutter 84a. These optical systems and units are driven by their corresponding motors 81b to 84b. In addition, the image pickup device 101 is attached to the barrel unit 8.

As shown in FIG. 7, the barrel unit 8 includes the cylindrical lens barrel 82 incorporating the optical systems and units, and a box-shaped base 81 holding the lens barrel 82 and incorporating the motors and the image pickup device 101. On a front surface of the base 81, a circular fixing frame 30 for holding a base portion of the lens barrel 82 is formed integrally at a position near one end thereof in the left-right direction. In addition, on the front surface of the base 81, a protruding portion 33 is formed integrally at a center portion in the up-down direction on an edge portion opposite to the holding portion of the lens barrel 82 in the left-right direction. A front surface of the protruding portion 33 is flush with the front surface of the base 81, and a long hole 32 elongated in the up-down direction is formed in the protruding portion 33. The image pickup device fixation unit is an assembling unit configured to adjust the orientation of the image pickup device fixed on the barrel unit to be matched with the orientation of the external cover and assemble the barrel unit and the external cover, and the storage unit stores the tilt signal output by the tilt detection unit in a state where the image pickup device is fixed by the assembling unit such that the orientation of the image pickup device fixed on the barrel unit is matched with the orientation of the external cover and where the orientation of the external cover is set to be horizontally and vertically aligned.

The barrel unit 8 is attached to the external cover 1 from the back surface side thereof. As shown in FIG. 8, the external cover 1 has a circular receiving hole 31 configured to receive the barrel unit 8, and the fixing frame 30 of the barrel unit 8 is fitted into the receiving hole 31. A boss 34 is fixed to the external cover 1 at a position near one edge thereof in the left-right direction. The boss 34 is capable of being fitted into the long hole 32 of the barrel unit 8. Fitting the fixing frame 30 of the barrel unit 8 into the receiving hole 31 of the external cover 1 causes the barrel unit 8 to be positioned with respect to the external cover 1 in the left-right and up-down directions. On the other hand, the rotational position of the barrel unit 8 about a lens optical axis can be adjusted within a range allowed to the boss 34 by the long hole 32 with the outer periphery of the fixing frame 30 being guided by the receiving hole 31 of the external cover 1. In other words, the tilt of the barrel unit 8 in the left-right direction can be adjusted with respect to the external cover 1. After the adjustment of the tilt, screwing a fixing screw 35 into the boss 34 through the long hole 32 as shown in FIG. 6 allows the barrel unit 8 to be fixed to the external cover 1 so as not to be displaced.

As shown in FIG. 6, the base 81 of the barrel unit 8 is partially cut out in the back surface side thereof. In the cutout portion 41, the image pickup device attachment plate 40 is positioned to the base 81 with two bosses 42 and 43 at two portions of the base 81, and attached to the base 81 with three screws 601, 602, 603. The image pickup device 101 is fastened to a front surface (a surface on the opposite side to the surface shown in FIG. 6) of the image pickup device attachment plate 40 with means such as an adhesive.

A flexible circuit board 401 for leading the captured image signal obtained by the image pickup device 101 to the main circuit board 50 is drawn out from one side edge portion of the image pickup device attachment plate 40. A connector 402 is attached to a leading end of the flexible circuit board 401. The connector 402 is configured to be connected to a connector 502 provided to the main circuit board 50, thus allowing the captured image signal to be inputted to the main circuit board 50. Major circuit elements, such as the F/E-IC 102 and the processor 104 described with reference to FIG. 3, are mounted on the main circuit board 5. On the other hand, the acceleration sensor 111 for detecting the tilt angle is mounted on the back surface side of the main circuit board 50.

The external cover 1 of the imaging apparatus is provided with legs 361, 362 slightly protruding from a bottom surface 48 at left and right end portions of the bottom surface 48 of the external cover 1. The lower surfaces of the respective legs 361, 362 serve as installation reference surfaces for the imaging apparatus. Thus, the external cover 1 can be set correctly horizontal in the horizontal direction by placing these legs 361, 362 on a horizontal surface such as a surface plate.

Figure 11:
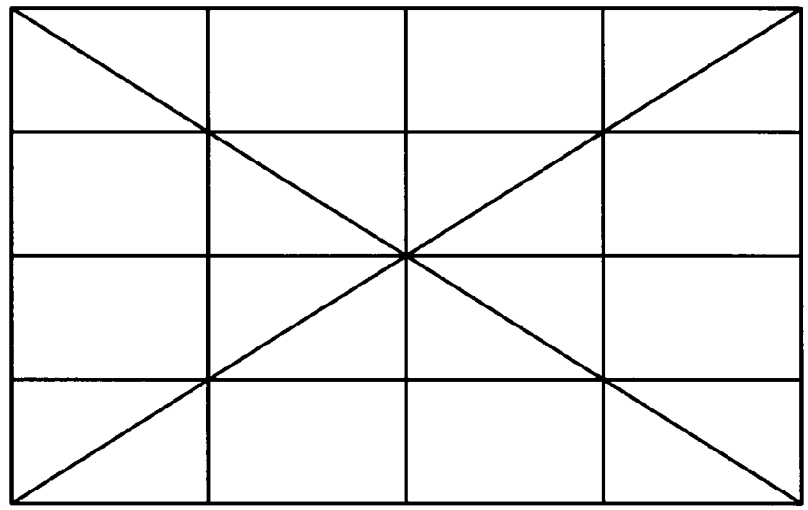
FIG. 11 is a front view showing an exemplary chart for horizontal check used in an assembling method for the imaging apparatus according to an embodiment of the present invention.

Hereinafter, description will be provided for a method of adjusting the tilt indicator in the above embodiment. The fixing screw 35 shown in FIG. 6 is loosely tightened, and thereby the barrel unit 8 is temporarily attached to be rotatable about the optical axis by using the receiving hole 31 of the external cover 1 as a guide. Then, the tilt indicator is placed on a surface plate formed to have an accurate flatness and set to be accurately leveled. The bottom surfaces of the legs 361, 362 are in contact with the top surface of the surface plate and the position of the external cover 1 is kept accurately horizontal. In this state, an image of a chart in which horizontal lines and vertical lines shown in FIG. 11 are depicted is captured through the barrel unit 8, and captured data of the chart is displayed on the LCD monitor 11 on the basis of the image signal obtained by the image pickup device 101. While the image data of the chart is being observed, the barrel unit 8 is rotated about the optical axis by using the receiving hole 31 of the external cover 1 as the guide so that the horizontal lines and the vertical lines in the chart can be correctly displayed on the LCD monitor 11. The image pickup device 101 is also rotated about the center of its light receiving surface in conjunction with the barrel unit 8. With these rotations, the captured data of the chart displayed on the LCD monitor 11 is rotated. Thus, the barrel unit 8 is adjusted so that the horizontal lines and the vertical line in the chart image displayed on the LCD monitor 11 can be correctly displayed, and the barrel unit 8 is fixed to the external cover 1 by tightening up the fixing screw 35 after the adjustment. In this way, the angle of the barrel unit 8 with respect to the external cover 1 is adjusted, and thereby the horizontal positions and vertical positions of the external cover 1 and the image pickup device 101 are matched with each other.

After the tilt indicator is adjusted to be exactly horizontal in the horizontal direction with the adjustment of the angle of the barrel unit 8 with respect to the external cover 1, the tilt angle displayed in the tilt indication image 12 on the LCD monitor 11 by the tilt indicator is calibrated to be 0. This is because the acceleration sensor 111 for displaying the tilt is attached to the main circuit board 50 which is a unit separate from the barrel unit 8 as shown in FIGS. 6 and 8, and an angle adjustment for attaching the acceleration sensor 111 to the external cover 1 is not yet made. For this adjustment, a calibration is performed using an output of the acceleration sensor 111 as a reference signal obtained with the image pickup device 101 correctly positioned in the horizontal and vertical directions.

Here, description is provided more specifically for the aforementioned methods of adjusting the image pickup device 101 and of performing calibration for the image pickup device 101 by using the output of the acceleration sensor 111.

Figure 12:
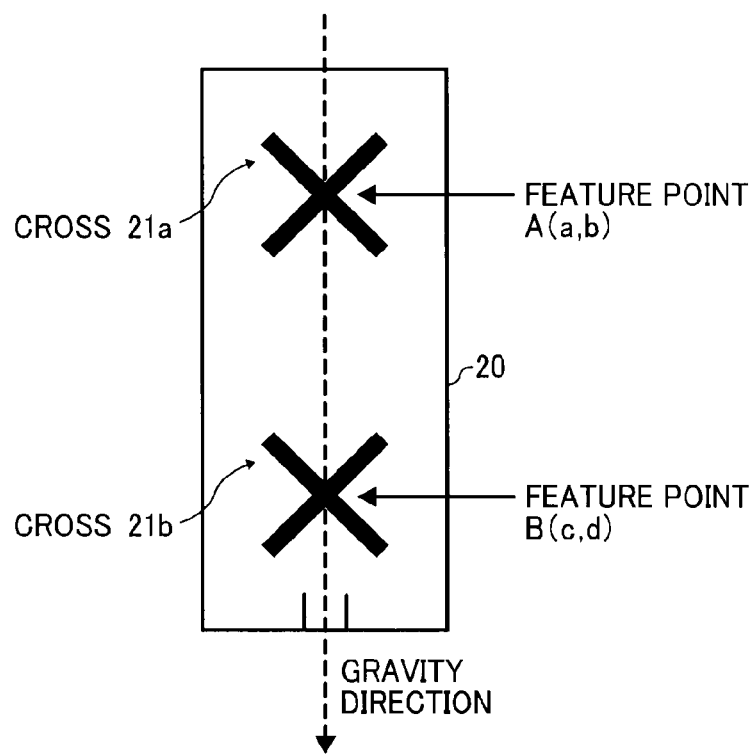
FIG. 12 is a front view showing an exemplary chart used for calibration of the tilt between an image pickup device and an acceleration sensor.

In the first place, the horizontal and vertical positions of the image pickup device are adjusted by use of a chart 20 shown in FIG. 12. The chart 20 is positioned so that a line connecting the center points (feature point) of crosses 21a and 21b is located on a line extending in the gravity direction. In other words, the chart 20 is positioned absolutely vertically. Here, let the center point of the cross 21a be a feature point A and the center point of the cross 21b be a feature point B. Then, the horizontal position and the vertical position of the image pickup device 101 are adjusted by acquiring the coordinates (denoted by (a, b)) of the feature point A and the coordinates (denoted by (c, d)) of the feature point B in the chart 20 are acquired from the image of the crosses 21a and 21b captured by the image pickup device 101.

Figure 13:
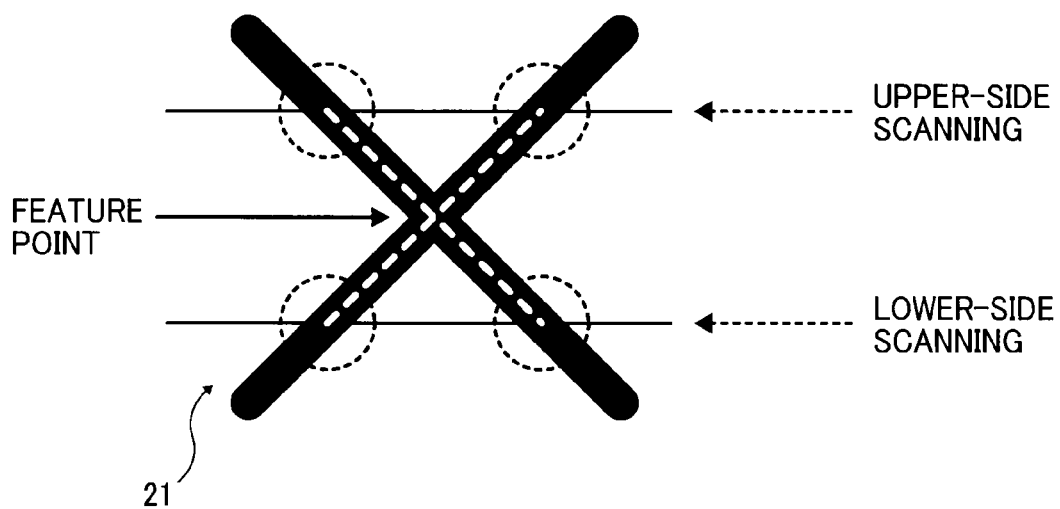
FIG. 13 is a front view showing captured image of the chart, and the scan operation on the captured image when the tilt between an image pickup device and an acceleration sensor is calibrated.

Then, the calibration for the image pickup device 101 by using the output of the acceleration sensor 111 is performed in the following manner. FIG. 13 shows an image of one of the two crosses 21 in the chart 20 captured by the image pickup device 101, and shows how the cross 21 is scanned on the captured image. Luminance data of the image of the cross 21 is acquired by horizontally scanning the image sequentially from the top side. When the scanning passes on a black portion of the cross 21, the luminance drops. Here, the center of each black strip of the cross 21 is defined as the middle point between a coordinate point where the luminance falls below a predetermined threshold and a coordinate point where the luminance exceeds a predetermined threshold. The horizontal scanning detects two luminance changes at the beginning because of two black strips are scanned, then detects one luminance change at the feature point, and then detects two luminance changes again. The image is scanned on both sides above and below the feature point, and two luminance changes are detected in each side scanning. Thus, four luminance change points of the cross 21 are detected in total. The coordinates of an intersection point of lines each diagonally connecting two of the four points are calculated and the position of the calculated coordinates is set as the center point (feature point) of the cross 21.

An angle θc of the image pickup device 101 with respect to the chart 20 is calculated based on the following formula (2) using the coordinates of the feature point A (a, b) of the cross 21a and the feature point B (c, d) of the cross 21b.

$$\theta c[\deg]=90-180/\pi *\arctan\{(b-d)/(a-c)\} \qquad (2)$$

Since a=c when the image pickup device 101 is correctly positioned in the horizontal and vertical directions, θc[deg] =90 according to the formula (2).

As described above, the barrel unit 8 is adjusted and fixed so that the angle θc of the image pickup device 101 can be 90 in the formula (2) by using the chart 20 positioned absolutely vertically with the external cover 1 kept accurately horizontal. In this way, the horizontal positions and vertical positions of the external cover 1 and the image pickup device 101 are matched with each other. Moreover, the output of the acceleration sensor 111 in this state is stored, and the calibration for the image pickup device 101 using the output of the acceleration sensor 111 can be performed by use of the stored output.

For this calibration, the output data (X, Y) of two orthogonal axes X and Y outputted by the acceleration sensor 111 in a state where the position of the image pickup device 101 is adjusted as described above and where the imaging apparatus is kept exactly horizontal in the horizontal direction is stored as output data (X0, Y0) under zero gravity in a rewritable non-volatile memory such as an EEPROM or a flash memory. Then, the output data (X0, Y0) stored in the memory is used as output representing that the image pickup device 101 is positioned correctly in the horizontal and vertical directions. In other words, the calibration is performed so that the tilt indication image 12 of the tilt indicator can correctly indicate the tilt as zero when an output of the acceleration sensor 111 is matched with the output stored in the memory.

In the above embodiment, the fixing frame 30, the receiving hole 31, the long hole 32, the boss 34, and the fixing screw 35 constitute a barrel unit attachment unit to attach the barrel unit 8 to the external cover 1 with adjustment of the angle of the barrel unit 8 thereto.

During the adjustment, the rotation center of the barrel unit 8 is the optical axis of the lens system, and the center of the image pickup device 101. It is preferable that the positions of the long hole 32 of the barrel unit 8 and the boss 34 of the external cover 1 fittable to the long hole 32 be as far as possible from the rotation center of the barrel unit 8. This is because the barrel unit can be more stable when being fixed to the external cover 1 with the fixing screw 35. In addition, the rotation adjustment of the barrel unit 8 can be easier. Thus, in the illustrated embodiment, the long hole 32 is provided in the protruding portion 33 formed in a side edge portion of the base 81 of the barrel unit 8 that is a side edge portion opposite from the fixing frame 30.

With use of the foregoing embodiment, the tilt indication image 12 of the tilt indicator correctly indicates the tile as zero when the imaging apparatus is kept exactly horizontal in the horizontal direction.

Incidentally, the assembling unit may include a receiving hole provided in one of the barrel unit and the external cover and a fixing frame provided in the other one of the barrel unit and the external cover and fitted in the receiving hole. Otherwise, the assembling unit may include a recessed portion provided in one of the barrel unit and the external cover and a protruding portion provided in the other of the barrel unit and the external cover and configured to be fitted in the recessed portion, the recessed and protruding portions being configured to allow the barrel unit to rotate about an optical axis thereof within a certain range. The boss 34 and the long hole 32 have a protruding and recessed relationship in which protruding and recessed members can be fitted to each other, and the protruding and recessed relationship may be inverted. Specifically, a boss may be provided to the barrel unit 8 and a long hole fittable to the boss may be provided in the external cover 1.

Hereinafter, an embodiment shown in FIGS. 9 and 10 will be described. In this embodiment, a barrel unit 8 is located in a predetermined position and then is attached to an external cover 1, and an image pickup device 101 is attached to the fixed barrel unit 8 after being adjusted in terms of an angle with respect to the barrel unit 8. A method for assembling an imaging apparatus according to another embodiment, includes the steps of preparing an external cover, an image pickup device, a barrel unit, and a tilt detection unit configured to output a tilt signal of the imaging apparatus, fixing the barrel unit on the external cover, setting an orientation of the external cover to be horizontally and vertically aligned, matching an orientation of the image pickup device with the orientation of the barrel unit fixed on the external cover in the state where the orientation of the external cover is horizontally and vertically aligned, attaching the image pickup device to the barrel unit in a state where the orientation of the image pickup device is matched with an orientation of the barrel unit fixed on the external cover, storing a tilt signal output by the tilt detection unit in a state where the orientation of the external cover is set to be horizontally and vertically aligned. The image pickup device fixation unit includes a boss about which the image pickup device rotates relative to the barrel unit.

Figure 9:
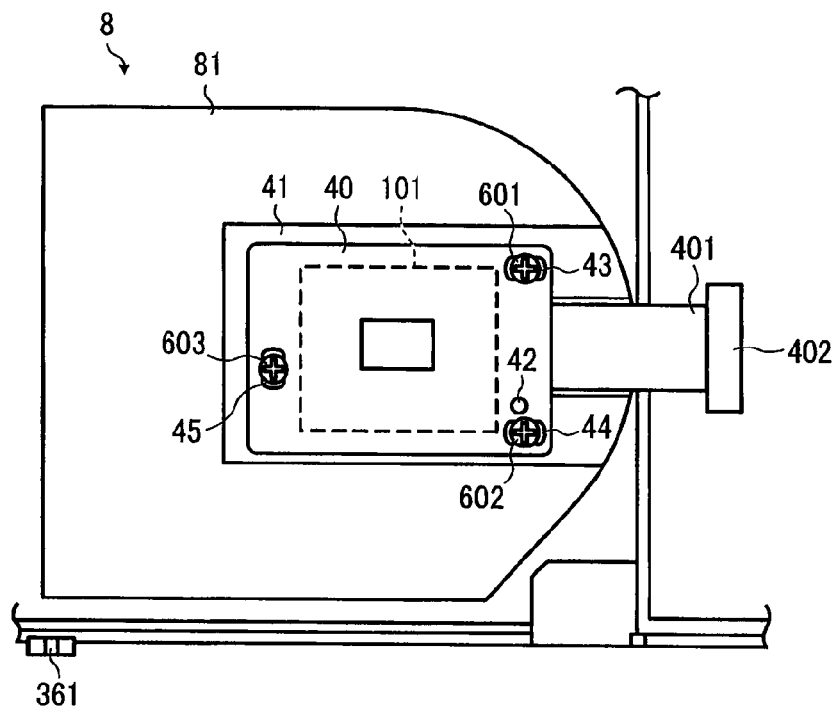
FIG. 9 is a rear view showing an another exemplary adjusting device of the tilt indicator in the imaging apparatus according to the present invention.
Figure 10:
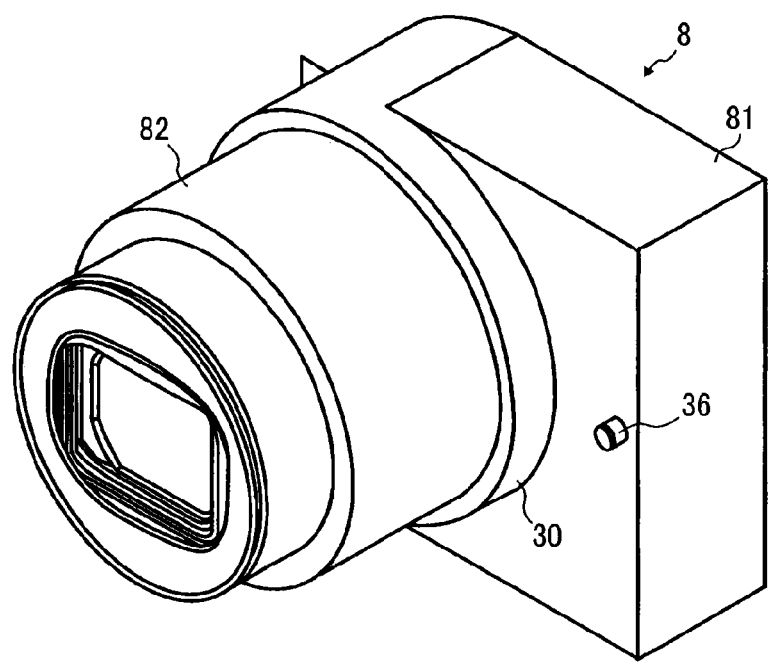
FIG. 10 is a perspective view showing a barrel unit in the embodiment.

In FIGS. 9 and 10, the front surface of a base 81 of the barrel unit 8 is provided with an alignment boss 36. The boss 36 is engaged with or fitted into an alignment hole provided in the external cover 1 in a state where a fixing frame 30 of the barrel unit 8 is fitted in a receiving hole 31 in the external cover 1. This engagement of the boss 36 makes the barrel unit 8 located in the predetermined position. An image pickup device attachment plate 40 is attached to a cutout portion 41 on the back surface side of the base 81 of the barrel unit 8 with three screws 601, 602, 603. The image pickup device 101 is fixedly attached to the front surface of the image pickup device attachment plate 40 by means of bonding or the like. The horizontal and vertical positions of the image pickup device bonded to the image pickup device attachment plate 40 are determined by use of predetermined jigs. Thus, the image pickup device 101 is bonded to the image pickup device attachment plate 40 while being in the horizontal and vertical positions thus determined.

A boss 42 is provided to the back surface side of the base 81. An engagement hole of the image pickup device attachment plate 40 is engaged with the boss 42, and thereby the image pickup device attachment plate 40 can be rotated about the boss 42. Here, the rotation range thereof is limited to a range allowed by three holes 43, 44, 45 of the image pickup device which the three screws 601, 602, 603 pass through, respectively. The three holes 43, 44, 45 each are a hole elongated in a direction in which the image pickup device attachment plate 40 rotates about the boss 42. To be more specific, since the boss 42 is located around a vertical line connecting the centers of the upper and lower screws 601, 602, the holes 43, 44 which the screws 601, 602 pass through are holes elongated in the horizontal direction. In addition, since the other hole 45 is located away from the boss 42 in the horizontal direction, the hole 45 which the screw 603 passes through is as a hole elongated in the vertical direction.

The hole 44 among the three holes 43, 44, 45 is located in the proximity of the boss 42 about which the image pickup device attachment plate 40 rotates, whereas the other two holes 43, 45 are located far from the boss 42. The hole 43 is far from the boss 42 in the upward direction in the FIG. 9, and is formed to be a hole elongated in the horizontal direction sufficiently to allow the image pickup device attachment plate 40 to rotate about the boss 42. In contrast, the hole 45 is far from the boss in the leftward direction in FIG. 9, and is formed to be a hole elongated in the vertical direction sufficiently to allow the image pickup device attachment plate 40 to rotate about the boss 42. The providing of the holes 43, 45 at the positions far from the boss 42 makes the image pickup device attachment plate 40 stable and easily adjustable in its rotational position when the image pickup device attachment plate 40 is fixed to the barrel unit 8 with the screws 601, 602.

In the embodiment shown in FIGS. 9 and 10, a tile adjustment, i.e., a roll angle adjustment of the image pickup device 100 with respect to the external cover 1 is made by adjusting the position of the image pickup device 101, more correctly, by adjusting the position of the image pickup device 101 together with the image pickup device attachment plate 40, instead of rotating the entire barrel unit 8. A tilt adjustment procedure is almost the same as in the foregoing embodiment. An imaging apparatus is placed on the surface plate with the three screws 601, 602, 603 loosely tightened, an image of a predetermined chart as shown in FIG. 11 is captured, the chart image is displayed on the LCD monitor 11 on the basis of the image signal obtained by the image pickup device 101. Then, while this chart image is being observed, the image pickup device 101 is rotated together with the image pickup device attachment plate 40 about the boss 42 so that the horizontal lines in the chart 20 can be displayed accurately in the horizontal direction on the LCD monitor 11. The rotational position of the image pickup device 101 is adjusted so that the horizontal lines in the chart image displayed on the LCD monitor 11 can be accurately aligned in the horizontal direction, and further the rotational position of the image pickup device 101 is adjusted so that the angle of the image pickup device 101 can become $\theta c = 90$ in the formula (2) by using the chart 20 as in the case of the foregoing embodiment. Then, the three screws 601, 602, 603 are tightened up to fix the image pickup device 101 together with the image pickup device attachment plate 40 to the barrel unit 8. In this way, the angle of the image pickup device 101 with respect to the external cover 1 is adjusted.

Next, as similar to the foregoing embodiment, the output data (X, Y) of two orthogonal axes X, Y outputted by the acceleration sensor 111 in a state where the image pickup device 101 is not tilt is stored as output data (X0, Y0) under zero gravity in a rewritable non-volatile memory such as an EEPROM or a flash memory. The output of the acceleration sensor 111 stored in the memory is used as output representing that the image pickup device 101 is positioned correctly in the horizontal and vertical direction. In other words, the calibration is performed so that the tilt indication image 12 of the tilt indicator can correctly indicate the tilt as zero when an output of the acceleration sensor 111 is matched with the output stored in the memory.

In this embodiment, the image pickup device attachment plate 40, the holes 43, 44, 45, the screws 601, 602, 603 constitute a barrel unit attachment unit to attach the image pickup device 101 to the barrel unit 8 with adjustment of the angle of the image pickup device 101 thereto. This embodiment can produce the same effects as the effects obtainable by the foregoing embodiment.

Effects of the Invention

According to an embodiment of the present invention, an imaging apparatus can be provided which is capable of indicating a tile as zero in the case where an imaging apparatus is placed on a horizontal desk or the like.

In addition, even in the case the accuracy in the degree of tile is enhanced, the tilt can be indicated as zero.

Although the present invention has been described in terms of exemplary embodiments, it is not limited thereto. It should be appreciated that variations may be made in the embodiments described by performs skilled in the art without departing from the scope of the present invention as defined by the following claims.

What is claimed is:

1. A method for assembling an imaging apparatus, comprising the steps of:
    preparing an external cover, an image pickup device, and a tilt detection unit configured to output a tilt signal of the imaging apparatus;
    setting an orientation of the external cover to be a predetermined orientation;
    matching an orientation of the image pickup device with the orientation of the external cover in the state where the orientation of the external cover is the predetermined orientation;
    fixing the image pickup device in the imaging apparatus in a state where the orientation of the image pickup device is matched with the orientation of the external cover;
    storing a tilt signal with respect to the image pickup device, which is output by the tilt detection unit in a state where the orientation of the external cover is set to be the predetermined orientation; and
    rotatably attaching an image pickup device attachment plate to a base, the image pickup device attachment plate including a first hole, a second hole and a third hole provided therein to limit a range of rotation of the image pickup device attachment plate,
    wherein the image pickup device has a rectangular shape, the first and second holes are located outside one side of the image pickup device and in the proximity of corners of the image pickup device, the third hole is located close to a central portion of a second side opposite to the first side of the image pickup device, and
    wherein a rotational center of the image pickup device attachment plate is set close to a side of the second hole facing the first hole, and the first hole has an elongate shape which is long in a perpendicular direction to the first side of the image pickup device, and the third hole has an elongated shape which is long in a parallel direction with the second side of the image pickup device.

2. The method for assembling the imaging apparatus, according to claim 1, further comprising the steps of:
    fixing the image pickup device to a barrel unit;
    matching the orientation of the image pickup device fixed to the barrel unit with the orientation of the external cover in a state where the orientation of the external cover is set to be the predetermined orientation; and
    attaching the barrel unit to the external cover in a state where the orientation of the image pickup device fixed to the barrel unit is matched with the orientation of the external cover.

3. The method for assembling the imaging apparatus, according to claim 1, further comprising the steps of:
    fixing the barrel unit on the external cover;
    matching an orientation of the image pickup device with the orientation of the external cover on which the barrel unit is fixed in the state where the orientation of the external cover is the predetermined orientation;
    attaching the image pickup device to the barrel unit in a state where the orientation of the image pickup device is matched with an orientation of the barrel unit fixed on the external cover.

4. An imaging apparatus comprising:
    an external cover;
    an image pickup device;
    a base;
    a tilt detection unit configured to output a tilt signal of the imaging apparatus;
    an image pickup device fixation unit configured to adjust an orientation of the image pickup device to be matched with an orientation of the external cover and fix the image pickup device in the imaging apparatus, the image pickup device fixation unit including an image pickup device attachment plate rotatably attached to the base, the image pickup device attachment plate including a first hole, a second hole and a third hole provided therein, which limit a range of rotation of the image pickup device attachment plate; and
    a storage unit configured to store the tilt signal output by the tilt detection unit,
    wherein the storage unit stores a tilt signal with respect to the image pickup device, which is output by the tilt detection unit in a state where the image pickup device is fixed by the image pickup device fixation unit such that the orientation of the image pickup device is matched with the orientation of the external cover and where the orientation of the external cover is set to be a predetermined orientation,
    wherein the image pickup device has a rectangular shape, and the first and second holes are located outside a first side of the image pickup device and in the proximity of corners of the image pickup device, the third hole being located close to a central portion of a second side opposite to the first side of the image pickup device,
    wherein a rotational center of the image pickup device attachment plate is set close to a side of the second hole and facing the first hole, and
    wherein the first hole has an elongated shape which is long in a perpendicular direction to the first side of the image pickup device, and the third hole has an elongated shape which is long in a parallel direction with the second side of the image pickup device.

5. The imaging apparatus according to claim 4, further comprising a barrel unit on which the image pickup device is fixed, wherein
    the image pickup device fixation unit is an assembling unit configured to adjust the orientation of the image pickup device fixed on the barrel unit to be matched with the orientation of the external cover and assemble the barrel unit and the external cover; and
    the storage unit stores the tilt signal output by the tilt detection unit in a state where the image pickup device is fixed by the assembling unit such that the orientation of the image pickup device fixed on the barrel unit is matched with the orientation of the external cover and where the orientation of the external cover is set to be the predetermined orientation.

6. The imaging apparatus according to claim 4, further comprising:
    a barrel unit on which the image pickup device is to be fixed, wherein
    the image pickup device fixation unit is configured to adjust the orientation of the image pickup device to be fixed to the barrel unit to be matched with the orientation of the external cover and fix the image pickup device to the barrel unit; and
    the storage unit stores the tilt signal output by the tilt detection unit in a state where the image pickup device is fixed by the image pickup device fixation unit such that the orientation of the image pickup device fixed to the barrel unit is matched with the orientation of the external cover on which the barrel unit is fixed and where the orientation of the external cover is set to be the predetermined orientation.

7. The imaging apparatus according to claim 5, wherein the image pickup device is attached to the barrel unit with the image pickup device attachment plate interposed therebetween.

8. The imaging apparatus according to claim 6, wherein the image pickup device is attached to the barrel unit with the image pickup device attachment plate interposed therebetween.

9. The imaging apparatus according to claim 5, wherein the assembling unit includes a receiving hole provided in the external cover and a fixing frame provided in the barrel unit and fitted in the receiving hole.

10. The imaging apparatus according to claim 5, wherein the assembling unit includes a recessed portion provided in one of the barrel unit and the external cover and a protruding portion provided in the other of the barrel unit and the external cover and configured to be fitted in the recessed portion, the recessed and protruding portions being configured to allow the barrel unit to rotate about an optical axis thereof within a certain range.

11. The imaging apparatus according to claim 9, wherein the assembling unit includes a recessed portion provided in one of the barrel unit and the external cover and a protruding portion provided in the other of the barrel unit and the external cover and configured to be fitted in the recessed portion, the recessed and protruding portions being configured to allow the barrel unit to rotate about an optical axis thereof within a certain range.

12. The imaging apparatus according to claim 6, wherein the image pickup device fixation unit includes a boss about which the image pickup device rotates relative to the barrel unit.

13. The imaging apparatus according to claim 12, wherein the image pickup device attachment plate is interposed between the barrel unit and image pickup device, and the image pickup device attachment plate is engaged with the boss about which the image pickup device rotates relative to the barrel unit.

14. The imaging apparatus according to claim 13, wherein the image pickup device fixation unit includes a plurality of screws configured to fix the image pickup device attachment plate to the barrel unit, and the plurality of elongated holes through which the respective screws pass so as to allow the image pickup device attachment plate to rotate about the boss relative to the barrel unit within a certain range.

15. The method for assembling the imaging apparatus according to claim 1, wherein the imaging apparatus includes a display unit configured to display an image captured by the image pickup device, a calculation unit configured to calculate a tilt of the imaging apparatus based on the tilt signal output by the tilt detection unit, and a display control unit configured to allow the display unit to display the tilt of the imaging apparatus calculated by the calculation unit.

16. The imaging apparatus according to claim 4, further comprising a display unit configured to display an image captured by the image pickup device, a calculation unit configured to calculate a tilt of the imaging apparatus based on the tilt signal output by the tilt detection unit, and a display control unit configured to allow the display unit to display the tilt of the imaging apparatus calculated by the calculation unit.

\* \* \* \* \*